A. H. BASTIAN.
FRUIT PICKER.
APPLICATION FILED DEC. 15, 1909.
980,045.
Patented Dec. 27, 1910.
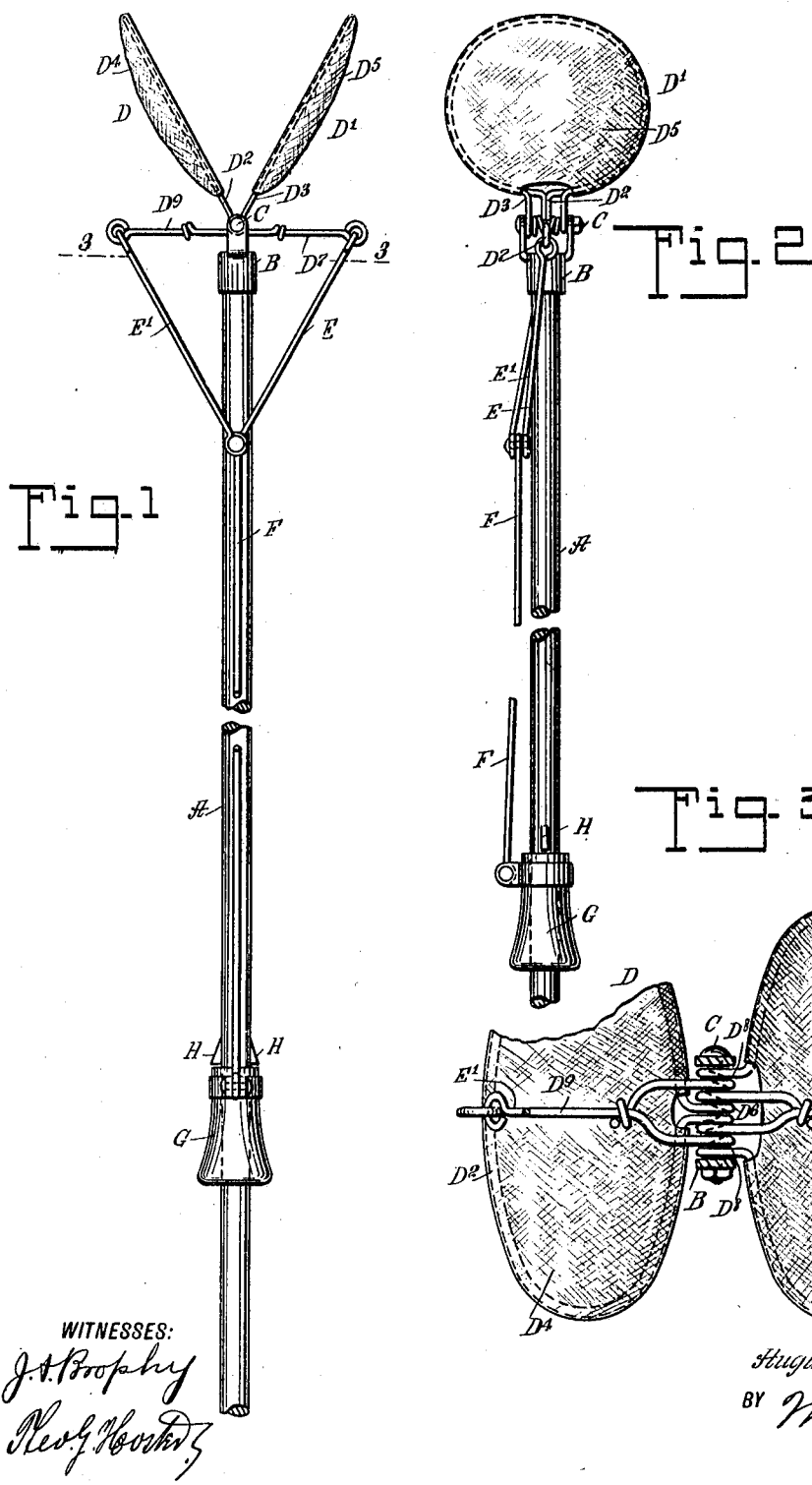
WITNESSES:
INVENTOR
August H. Bastian
BY
ATTORNEYS

UNITED STATES PATENT OFFICE.

AUGUST HENRY BASTIAN, OF PORTLAND, OREGON.

FRUIT-PICKER.

980,045.

Specification of Letters Patent.   Patented Dec. 27, 1910.

Application filed December 15, 1909.   Serial No. 533,137.

*To all whom it may concern:*

Be it known that I, AUGUST H. BASTIAN, a citizen of the United States, and a resident of Portland, in the county of Multnomah and State of Oregon, have invented a new and Improved Fruit-Picker, of which the following is a full, clear, and exact description.

The object of the invention is to provide a new and improved fruit picker, arranged to insure ready detachment of the fruit from the tree and to prevent bruising thereof during the act of detaching the fruit and lowering of the same to the ground for removal from the picker.

For the purpose mentioned, use is made of a pair of cup-shaped picking members, pivoted at their lower ends on the upper end of a stick, to swing toward and from each other, the openings of the said members being opposite each other to allow the fruit to pass between the members at the time the latter are in open position and to inclose the fruit between them when closed, and manually-controlled means mounted on the stick and connected with the said picking members to open and close the same.

A practical embodiment of the invention is represented in the accompanying drawings forming a part of this specification, in which similar characters of reference indicate corresponding parts in all the views.

Figure 1 is a front elevation of the fruit picker; Fig. 2 is a side elevation of the same; and Fig. 3 is an enlarged inverted sectional plan view of the same on the line 3—3 of Fig. 1.

On the upper end of a stick A is secured a forked-shaped bearing B, carrying a pivot C, on which are mounted to swing cup-shaped picking members D and D', having their openings opposite each other, to move in register when the members are closed, for retaining the fruit. The members D and D' consist essentially of wire rings $D^2$, $D^3$, on which are secured the body or basket portions $D^4$, $D^5$, and the lower end of the ring $D^2$ is bent to form an eye $D^6$, through which extends the pivot C, and the said eye terminates in an arm $D^7$ extending at an angle to the face or mouth of the member D. The ring $D^3$ of the other member D' is bent to form eyes $D^8$, through which extends the pivot pin C, and the said eyes terminate in an angular arm $D^9$ similar to the arm $D^7$, but extending in an opposite direction, as will be readily understood by reference to Figs. 1 and 2. The outer ends of the angular arms $D^7$, $D^9$ are pivotally connected by links E and E' with the upper end of a rod F, pivotally connected at its lower end to a sleeve G, mounted to slide on the stick A a distance from the lower end thereof. The upward movement of the sleeve G is limited by stops H held on the stick A. When the sleeve G is in the uppermost position, as shown in Figs. 1 and 2, then the picking members D and D' are in an open position, so that the fruit to be picked can readily pass between the said members, and when this has taken place the operator slides the sleeve G downward on the stick A, so that the rod F exerts a pull on the links E, E', which in turn swing the arms $D^7$, $D^9$ downward, thus swinging the picking members D and D' toward each other into a closed position, to inclose the fruit between them. A pull now exerted by the operator on the stick A readily detaches the fruit from the tree, and as the fruit is firmly inclosed in the members D, D' it is not liable to be bruised during the detaching operation and while lowering the same to the ground on manipulating the stick A correspondingly.

In order to disengage the fruit from the members D and D', it is only necessary for the operator to slide the sleeve G forward on the stick A, so that the members D and D' swing open and allow the fruit to pass out of the members into a basket or other receptacle. The parts of the picker are then again in position ready for engagement with another fruit to be picked.

It is understood that the fabric material, forming the baskets or bodies $D^4$, $D^5$, is sufficiently soft to prevent injury to the fruit while detaching the same or lowering the fruit to the ground, as before explained, and by making the rings or frames $D^2$, $D^3$ of wire they can be readily bent to the desired shape for forming the members D, D' as well as the eyes $D^6$, $D^8$ and the angular arms $D^7$, $D^9$.

The fruit picker shown and described is very simple and durable in construction, composed of comparatively few parts, and not liable easily to get out of order.

Having thus described my invention, I claim as new and desire to secure by Letters Patent:

1. A fruit picker, comprising a pair of cup shaped picking members, each formed of a wire ring and a fabric basket portion secured to the ring each ring having its ends bent to form eyes and secured together and forming an approximately right angular arm, a stick having a forked bearing at its upper end, between the members of which the eyes of the picking members are arranged, a pivot in the forked bearing and passing through the eyes of the rings of the picking members, a sleeve sliding on the lower end of the stick, a rod pivoted to the sleeve, links pivoted to the rod and to the angular arms of the picking members, and a stop on the stick for limiting the upward movement of the sleeve.

2. In a fruit picker, a stick provided with a forked upper end, a pair of cup-shaped picking members, each formed of a wire ring and a fabric basket portion secured to the ring, each ring having its ends bent to form eyes and secured together with one end projecting beyond the other to form an approximately right angular arm, the eyes of one ring being adjacent to each other and arranged between the eyes of the other ring, a pivot in the forked upper end of the stick and passing through the said eyes, an operating rod, and links pivoted to the rod and to the said angular arms.

In testimony whereof I have signed my name to this specification in the presence of two subscribing witnesses.

AUGUST HENRY BASTIAN.

Witnesses:
 PETER HUME,
 H. W. TICKNOR.